(12) United States Patent
Jiang et al.

(10) Patent No.: US 11,472,034 B2
(45) Date of Patent: Oct. 18, 2022

(54) LIFETIME ESTIMATION DEVICE FOR ROBOT

(71) Applicant: FANUC CORPORATION, Yamanashi (JP)

(72) Inventors: Hangjie Jiang, Yamanashi (JP); Shun Suyama, Yamanashi (JP); Yuuki Kimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 239 days.

(21) Appl. No.: 17/060,491

(22) Filed: Oct. 1, 2020

(65) Prior Publication Data
US 2021/0122047 A1  Apr. 29, 2021

(30) Foreign Application Priority Data
Oct. 28, 2019  (JP) .............................. JP2019-195136

(51) Int. Cl.
*B25J 9/00* (2006.01)
*B25J 9/16* (2006.01)
*B25J 9/12* (2006.01)

(52) U.S. Cl.
CPC ............. *B25J 9/1674* (2013.01); *B25J 9/123* (2013.01); *B25J 9/161* (2013.01); *B25J 9/1653* (2013.01)

(58) Field of Classification Search
CPC . B25J 9/1674; B25J 9/123; B25J 9/161; B25J 9/1653; B25J 19/0066; G05B 2219/37252; G05B 2219/39412
See application file for complete search history.

(56) References Cited

U.S. PATENT DOCUMENTS

| 2009/0043425 | A1  | 2/2009  | Ito et al. |
| 2012/0152877 | A1* | 6/2012  | Tadayon ............... B25J 5/005 901/30 |
| 2015/0306768 | A1  | 10/2015 | Liang et al. |

FOREIGN PATENT DOCUMENTS

| EP | 2025477 A2    | 2/2009  |
| JP | H09-136287 A  | 5/1997  |
| JP | 2000-141275 A | 5/2000  |
| JP | 2009-043165 A | 2/2009  |
| JP | 2015-208811 A | 11/2015 |

\* cited by examiner

*Primary Examiner* — Ian Jen
(74) *Attorney, Agent, or Firm* — Maier & Maier, PLLC (57) ABSTRACT

A lifetime estimation device for a robot including a linear-motion mechanism including a guide member and at least one slider moving along the guide member includes: a load calculation unit that calculates, at predetermined time intervals, a load acting on each slider on a basis of a program for operating the robot and geometric parameters of the robot and a load mounted on the robot; a travel-distance calculation unit that calculates travel distances of the slider at the time intervals; a lifetime calculation unit that calculates a lifetime of the linear-motion mechanism on a basis of the loads calculated by the load calculation unit and the travel distances calculated by the travel-distance calculation unit; and a display unit that displays the calculated lifetime.

6 Claims, 8 Drawing Sheets

FIG. 8 ures of rotary shafts of robots. Such a lifetime estimation device monitors an electrical current value in a motor for driving a rotary shaft and calculates the lifetime of the rotary shaft on the basis of the electrical current value.

LIFETIME ESTIMATION DEVICE FOR ROBOT

CROSS-REFERENCE TO RELATED APPLICATIONS

This application is based on Japanese Patent Application No. 2019-195136, the content of which is incorporated herein by reference.

FIELD

The present invention relates to a lifetime estimation device for a robot.

BACKGROUND

There are well-known lifetime estimation devices for estimating the lifetimes of rotary shafts of robots. Such a lifetime estimation device monitors an electrical current value in a motor for driving a rotary shaft and calculates the lifetime of the rotary shaft on the basis of the electrical current value.

One aspect of the present invention is directed to a lifetime estimation device for a robot including a linear-motion mechanism including a guide member and at least one slider moving along the guide member, the lifetime estimation device including: a load calculation unit that calculates, at a predetermined time interval, a load acting on each slider on a basis of a program for operating the robot and geometric parameters of the robot and a load mounted on the robot; a travel-distance calculation unit that calculates a travel distance of the slider at said time interval; a lifetime calculation unit that calculates a lifetime of the linear-motion mechanism on a basis of the loads calculated by the load calculation unit and the travel distance calculated by the travel-distance calculation unit; and a display unit that displays the calculated lifetime.

DETAILED DESCRIPTION OF EMBODIMENTS

A lifetime estimation device 1 for a robot according to one embodiment of the present invention will now be described with reference to the drawings.

The lifetime estimation device 1 for a robot according to this embodiment is included in a controller of a robot 100 or an off-line programming device of the robot 100.

Figure 1:
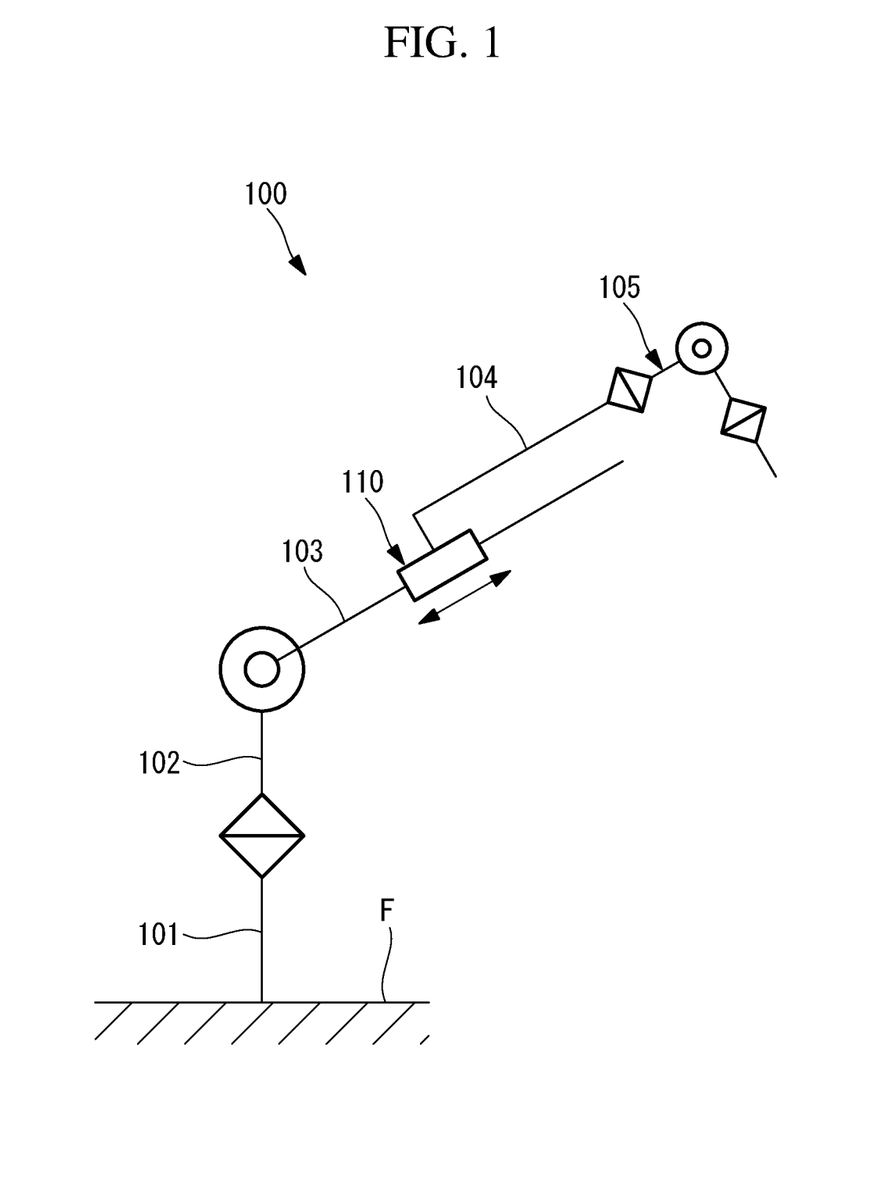
FIG. 1 is a schematic diagram showing one example of a robot to which a lifetime estimation device according to one embodiment of the present invention is applied.

As shown in, for example, FIG. 1, the robot 100 includes a linear-motion mechanism 110 on at least one shaft constituting the robot 100.

The robot 100 shown in FIG. 1 includes: a base 101 installed on a floor surface F; a swiveling body 102 swivelable about a vertical first axial line relative to the base 101; and a first arm 103 rotatable about a horizontal second axial line relative to the swiveling body 102. In addition, the robot 100 includes: a second arm 104 linearly movable, by means of the linear-motion mechanism 110, in the longitudinal direction of the first arm 103 relative to the first arm 103; and a three-axis wrist unit 105 disposed at a tip of the second arm 104.

Figure 2:
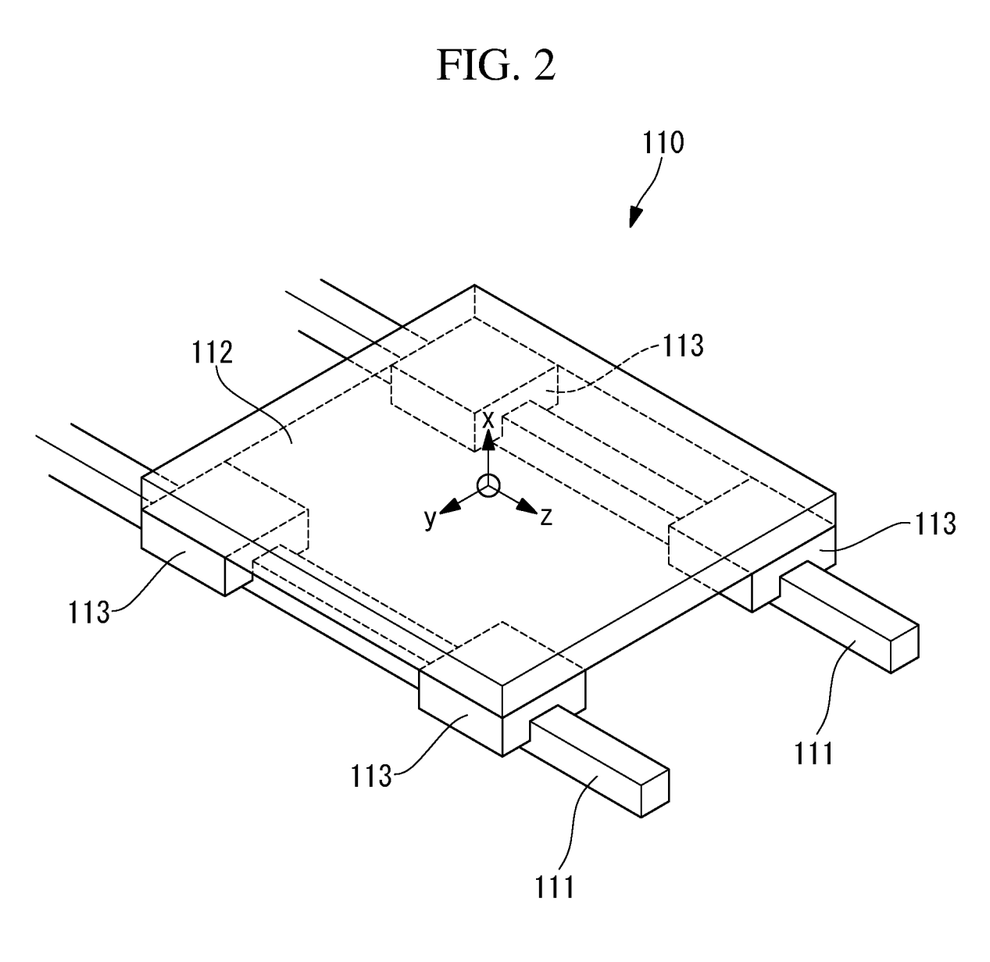
FIG. 2 is a perspective view showing one example of a linear-motion mechanism of the robot in FIG. 1.

As shown in, for example, FIG. 2, the linear-motion mechanism 110 includes: two guide rails (guide members) 111 that are fixed to the first arm 103 and that are disposed parallel to each other; and a slide member 112 movable along these guide rails 111. Each of the guide rails 111 has two sliders 113 assembled thereon such that the two sliders 113 are movable along the guide rail 111.

The slide member 112 is supported by the two sliders 113 on each of the two guide rails 111, i.e., a total of four sliders 113, so as to be movable along the longitudinal direction of the guide rails 111. Also, the second arm 104 is fixed to the sliders 113. By doing so, the second arm 104 is supported so as to be linearly movable in the longitudinal direction of the first arm 103 relative to the first arm 103.

Figure 3:
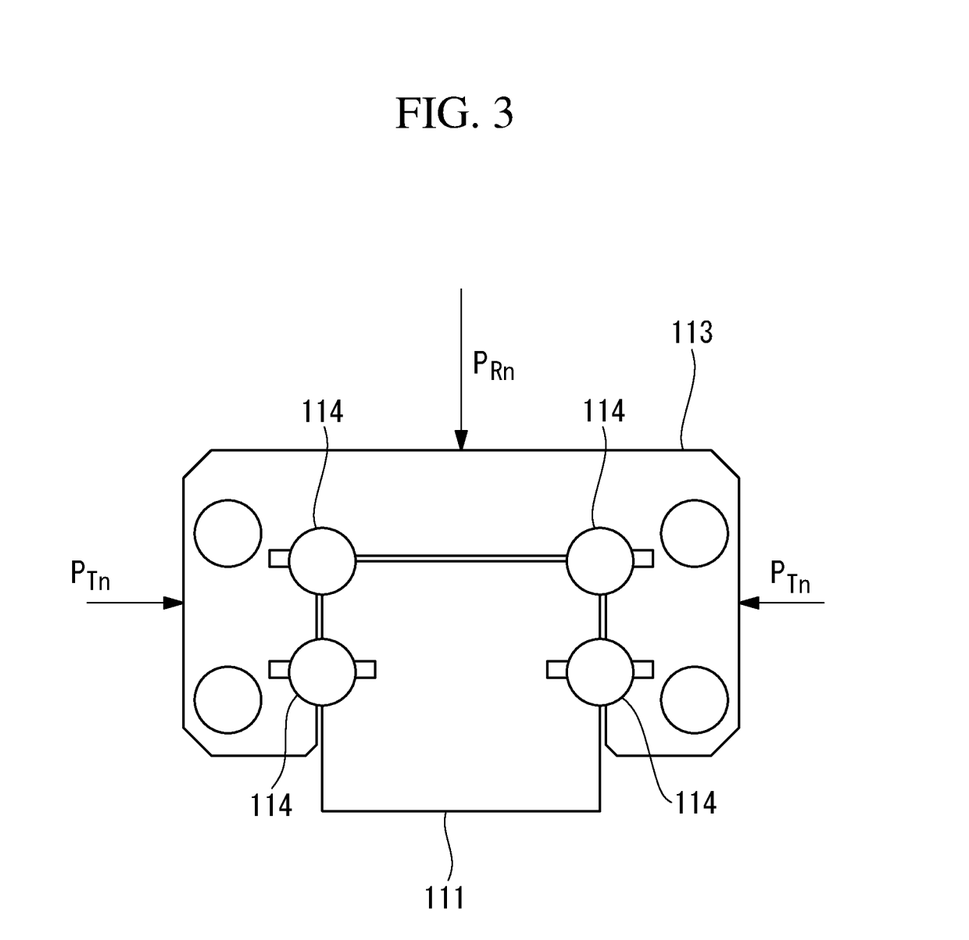
FIG. 3 is a front view showing one example of a slider included in the linear-motion mechanism in FIG. 2.

As shown in FIG. 3, each of the sliders 113 is guided so as to be movable in the longitudinal direction of the guide rail 111 through the rolling of a plurality of rolling elements 114 disposed between the slider 113 and the guide rail 111.

Figure 4:
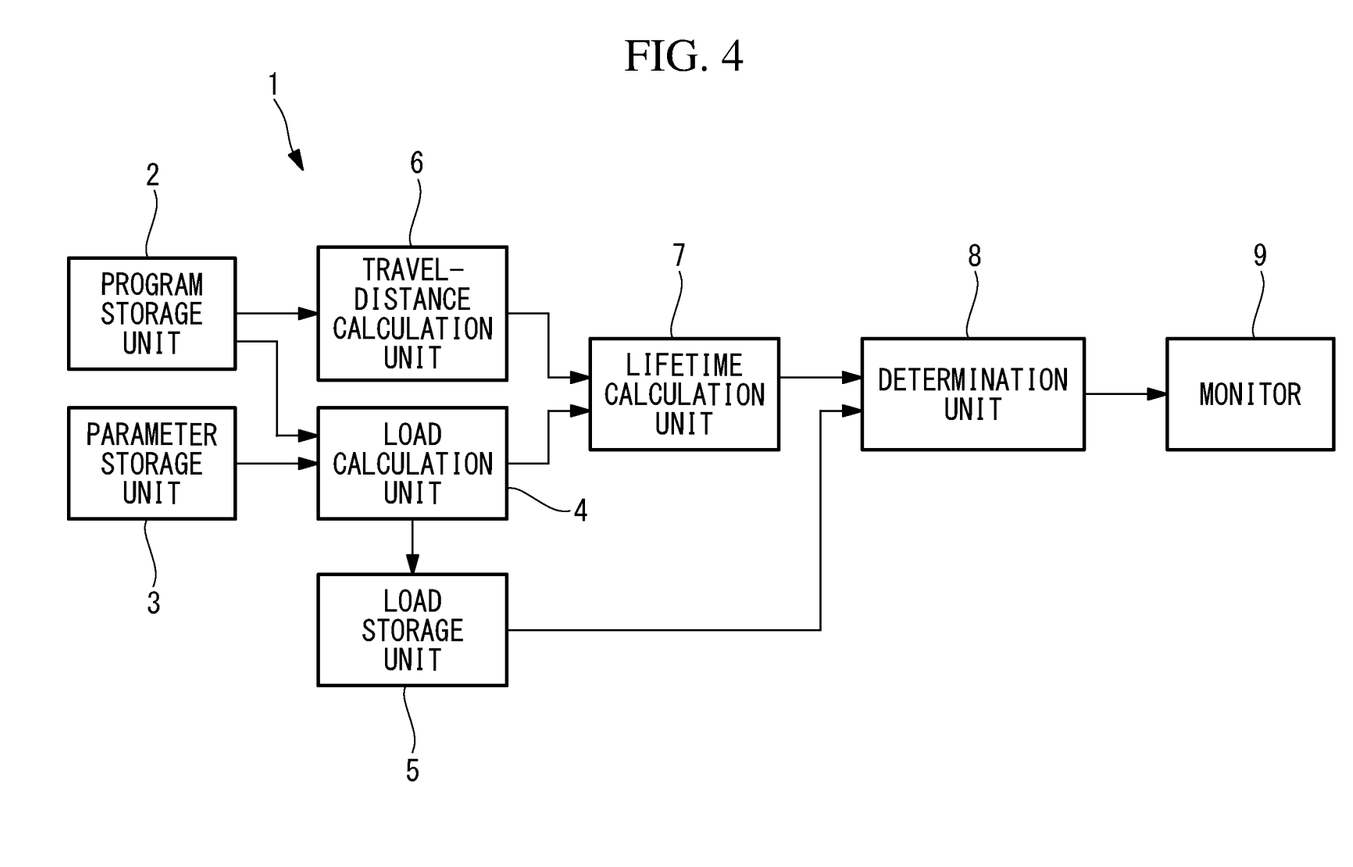
FIG. 4 is a block diagram showing the lifetime estimation device in FIG. 1.

As shown in FIG. 4, the lifetime estimation device 1 according to this embodiment includes: a program storage unit 2 for storing an operating program; and a parameter storage unit 3 for storing geometric parameters of the robot 100 and information on loads mounted on the robot 100. The program storage unit 2 and the parameter storage unit 3 are memories. In the case where the lifetime estimation device 1 is included in the controller of the robot 100, the program storage unit 2 and the parameter storage unit 3 may be included in the controller.

With the stored operating program, it is possible to calculate the position/orientation, speed, acceleration, and stroke of each shaft of the robot 100 at each time while the operating program is executed.

The geometric parameters include the size and the weight of each part of the robot 100. The size of each part includes information on the positions of the four sliders 113 relative to the slide member 112 of the linear-motion mechanism 110. The information on the loads includes the size and weight of a tool, such as a hand, mounted on the robot 100 and, while a workpiece is gripped by the hand, the size and weight of the workpiece.

In addition, the lifetime estimation device 1 includes a load calculation unit 4 that calculates a load acting on each of the sliders 113 every time Tn at predetermined time intervals Δt while the operating program is executed off-line.

More specifically, first the load calculation unit 4 calculates, by means of the operating program stored in the program storage unit 2, the position, speed, and acceleration of each shaft of the robot 100 at each time Tn while the operating program is executed off-line. Next, the load calculation unit 4 calculates the external force and moment acting on a reference position of the slide member 112 on the basis of the calculated position, speed, and acceleration of each shaft of the robot 100, as well as on the basis of the geometric parameters stored in the parameter storage unit 3.

As shown in FIG. 2, the reference position of the slide member 112 is, for example, the position of the center of gravity of the slide member 112. The load calculation unit 4 calculates external forces along directions of three perpendicular coordinate axes x, y, and z that are set at the reference position and a moment about each of the coordinate axes x, y, and z. The positions and the directions of the coordinate axes x, y, and z may be arbitrary.

Also, by using the calculated external force and moment acting on the position of the center of gravity of the slide member 112, a load acting on each of the sliders 113 is calculated on the basis of the distance between the position of the center of gravity of the slide member 112 and the position of the center of gravity of each of the four sliders 113.

As shown in FIG. 3, the loads that are first calculated in the load calculation unit 4 are loads $P_{Rn}$ and $P_{Tn}$ in two directions orthogonal to the longitudinal direction (z direction) of each of the guide rails 111, i.e., one of the two directions being the height direction (x direction) of each of the sliders 113 and the other being the width direction (y direction) of the slider 113.

Then, on the basis of the loads $P_{Rn}$ and $P_{Tn}$, in the two directions, calculated for each of the sliders 113, the load calculation unit 4 calculates an equivalent load $P_{En}$ from expression (1) below.

$$P_{En} = K_x P_{Rn} + K_y P_{Tn} \tag{1}$$

Here, $K_x$ and $K_y$ are equivalent coefficients and are values inherent to the linear-motion mechanism.

The lifetime estimation device 1 includes a load storage unit (storage unit) 5 that is connected to the load calculation unit 4 and that stores, in a time series manner, a plurality of the equivalent loads $P_{En}$ calculated in the load calculation unit 4.

Furthermore, the lifetime estimation device 1 includes a travel-distance calculation unit 6 that calculates, by using expression (2) below on the basis of the operating program stored in the program storage unit 2, the total travel distance (travel distance) L at the time the operating program is executed all the way through.

$$L = \sum_{n=1}^{k} L_n \tag{2}$$

Here, $L_n$ is the travel distance of each of the sliders 113 calculated every sampling time $\Delta t$, and k is a natural number obtained by dividing the program execution time by the time interval $\Delta t$.

Also, the lifetime estimation device 1 includes a lifetime calculation unit 7 that calculates a mean load $P_n$ and a lifetime E on the basis of the equivalent loads $P_{En}$ calculated by the load calculation unit 4 and the total travel distance L calculated by the travel-distance calculation unit 6.

The lifetime calculation unit 7 calculates, from expressions (3) and (4) below, the mean load $P_n$ and the lifetime E for each of the sliders 113.

$$P_m = \frac{1}{L} \cdot \sum_{n=1}^{k} (p_{En}^i \cdot L_n) \tag{3}$$

Here, i is a constant determined by the rolling elements 114 of the slider 113 and is a value inherent to the linear-motion mechanism 110.

$$E = \left( \frac{f_H \cdot f_T \cdot f_C}{f_W} \cdot \frac{C}{P_m} \right)^3 \times 50 \tag{4}$$

Here, $f_H$ is a hardness coefficient, $f_T$ is a temperature coefficient, $f_C$ is a contact coefficient, $f_W$ is a load coefficient, and C is a basic dynamic load rating. These values are inherent to the linear-motion mechanism 110.

Also, the lifetime estimation device 1 includes a determination unit 8 for determining whether or not the lifetime E calculated in the lifetime calculation unit 7 is shorter than a predetermined threshold Th. If it is determined that any of the lifetimes calculated for the four sliders 113 is shorter than the threshold Th, the determination unit 8 outputs, on a slider 113 by slider 113 basis, the lifetime shorter than the threshold Th, as well as a temporal change in the equivalent loads $P_{En}$ stored in the load storage unit 5. If the calculated lifetime E is equal to or longer than the threshold Th, the determination unit 8 does not output such information.

In addition, the lifetime estimation device 1 includes a monitor (display unit) 9 for displaying the lifetime E and the temporal change in the equivalent loads $P_{En}$ that have been output from the determination unit 8.

Figure 5:
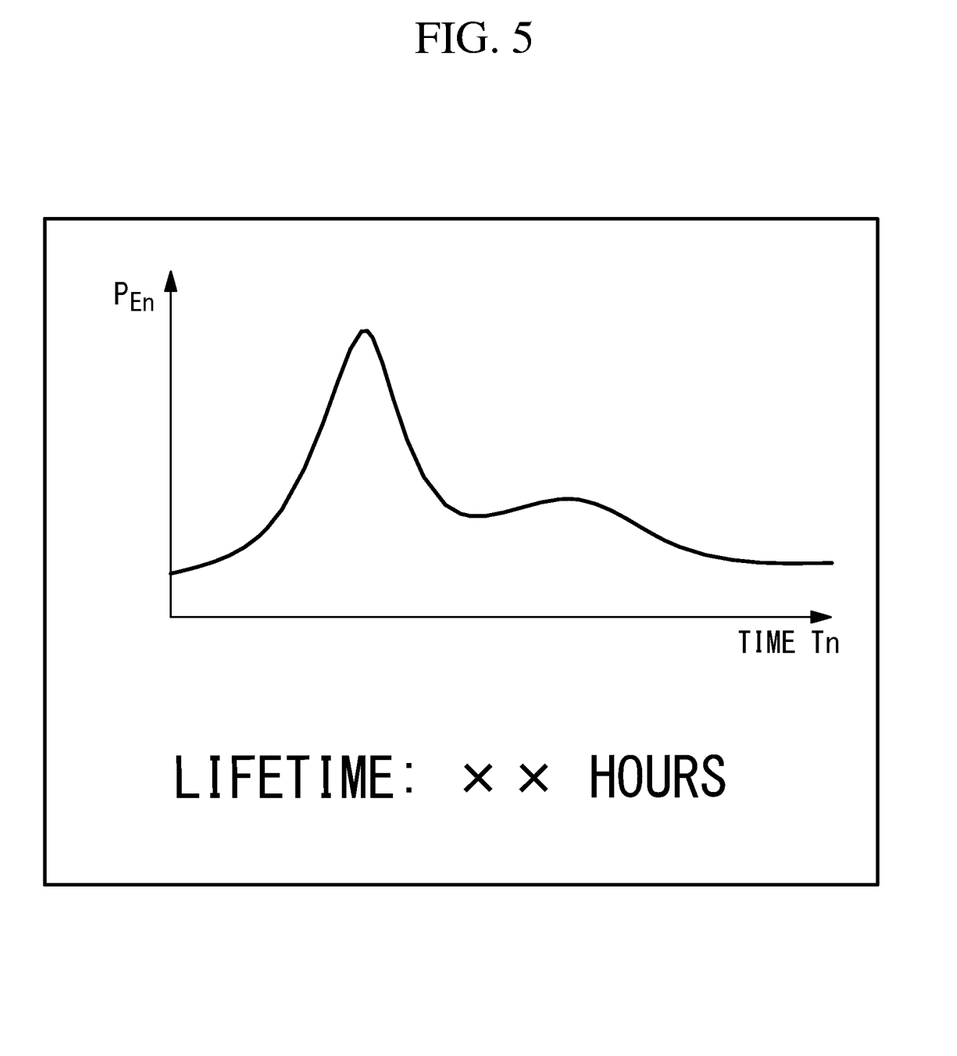
FIG. 5 is a diagram showing an example of a display displayed on a monitor of the lifetime estimation device in FIG. 1.

As shown in, for example, FIG. 5, the display unit 9 displays the lifetime E in the form of a numerical value, as well the temporal change in the equivalent loads $P_{En}$ in the form of a graph. The lifetime E may be displayed in the form of a graph.

The travel-distance calculation unit 6, the load calculation unit 4, the lifetime calculation unit 7, and the determination unit 8 are processors and memories, and the load storage unit 5 is a memory.

The operation of the lifetime estimation device 1 according to this embodiment with the above-described structure will be described below.

Figure 6:
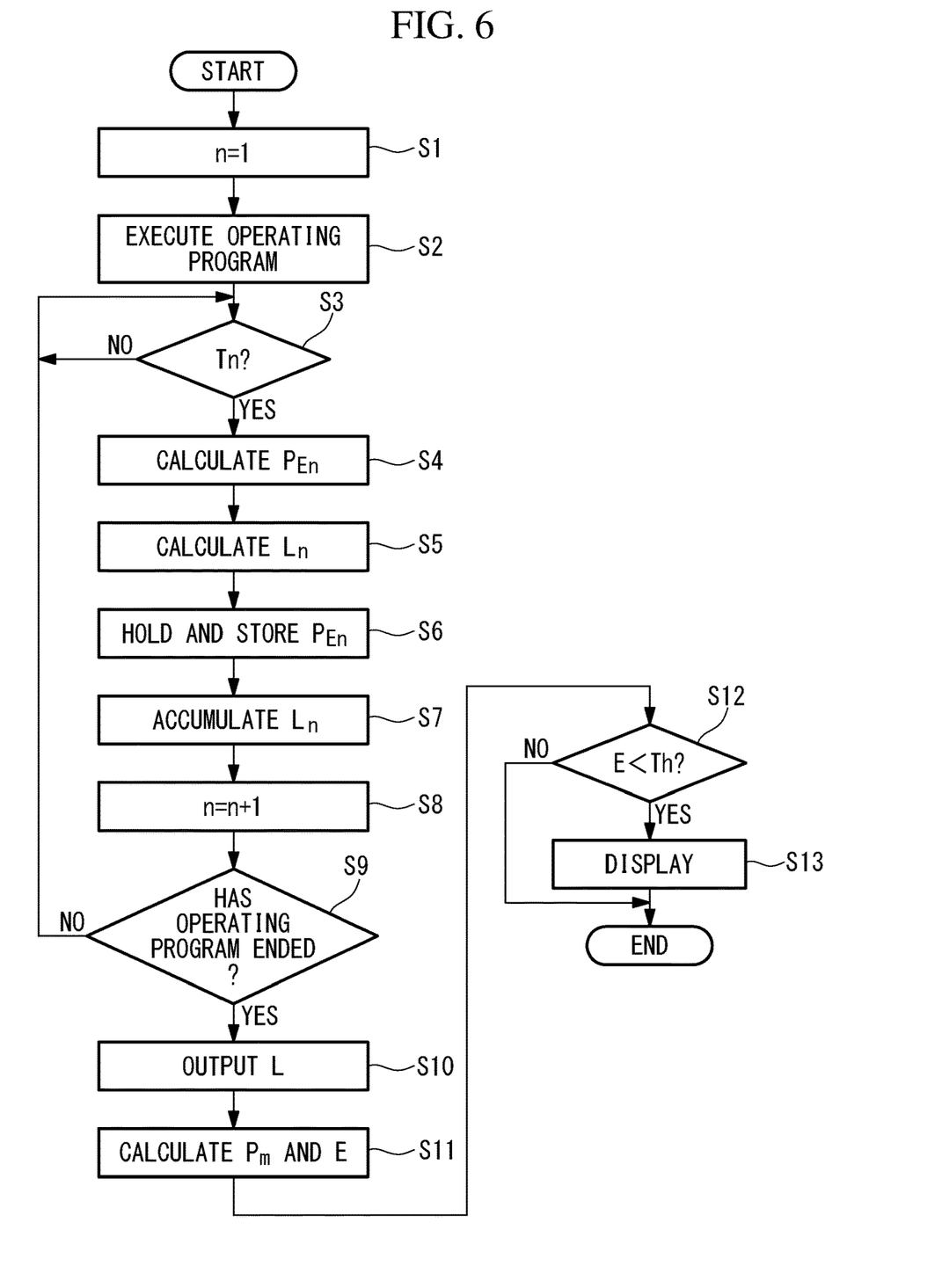
FIG. 6 is a flowchart for illustrating the operation of the lifetime estimation device in FIG. 1.

According to the lifetime estimation device 1 of this embodiment, first a counter n is initialized, as shown in FIG. 6 (step S1). Next, the operating program is executed (step S2), and then it is determined whether or not the time Tn has been reached (step S3).

When the time Tn has been reached, the equivalent load $P_{En}$ is calculated by the load calculation unit 4, and a travel distance $L_n$ is calculated by the travel-distance calculation unit 6, on the basis of the operating program and the geometric parameters (steps S4 and S5). The calculated equivalent load $P_{En}$ is output to the lifetime calculation unit 7 and is held in the lifetime calculation unit 7. In addition, the equivalent load $P_{En}$ is stored in the load storage unit 5 in association with the time Tn (step S6). The calculated travel distance $L_n$ is accumulated in the travel-distance calculation unit 6 (step S7).

The counter n is incremented (step S8), and it is determined whether or not the operating program has ended (step S9). If the operating program has not ended, the processes from step S2 are repeated.

When it is determined in step S9 that the operating program has ended, the total travel distance L accumulated in the travel-distance calculation unit 6 is output to the lifetime calculation unit 7 (step S10), and the mean load $P_m$ and the lifetime E are calculated by the lifetime calculation unit 7 on the basis of the held equivalent loads $P_{En}$ and the total travel distance L (step S11).

Then, it is determined by the determination unit 8 whether or not the calculated lifetime E is shorter than the predetermined threshold Th (step S12). If the lifetime E is shorter than the predetermined threshold Th, the calculated lifetime E and temporal changes in the equivalent loads $P_{En}$ stored in the load storage unit 5 are displayed on the display unit 9 (step S13).

In this manner, the lifetime estimation device 1 according to this embodiment affords an advantage in that, even in the case where the robot 100 includes the linear-motion mechanism 110, in which the lifetime E cannot be calculated on the basis of the electrical current value in a motor, the lifetime E of the robot 100 can be easily and accurately estimated.

Also, as a result of the calculated lifetime E being displayed when the calculated lifetime E is shorter than the predetermined threshold Th, the user can recognize that the operating program is a program that applies a large load to the robot 100. In addition, as a result of the temporal change in the equivalent loads $P_{En}$ being displayed in the form of a graph at the same time, the user can be informed of at which time Tn the robot 100 is subjected to a large load.

Figure 7:
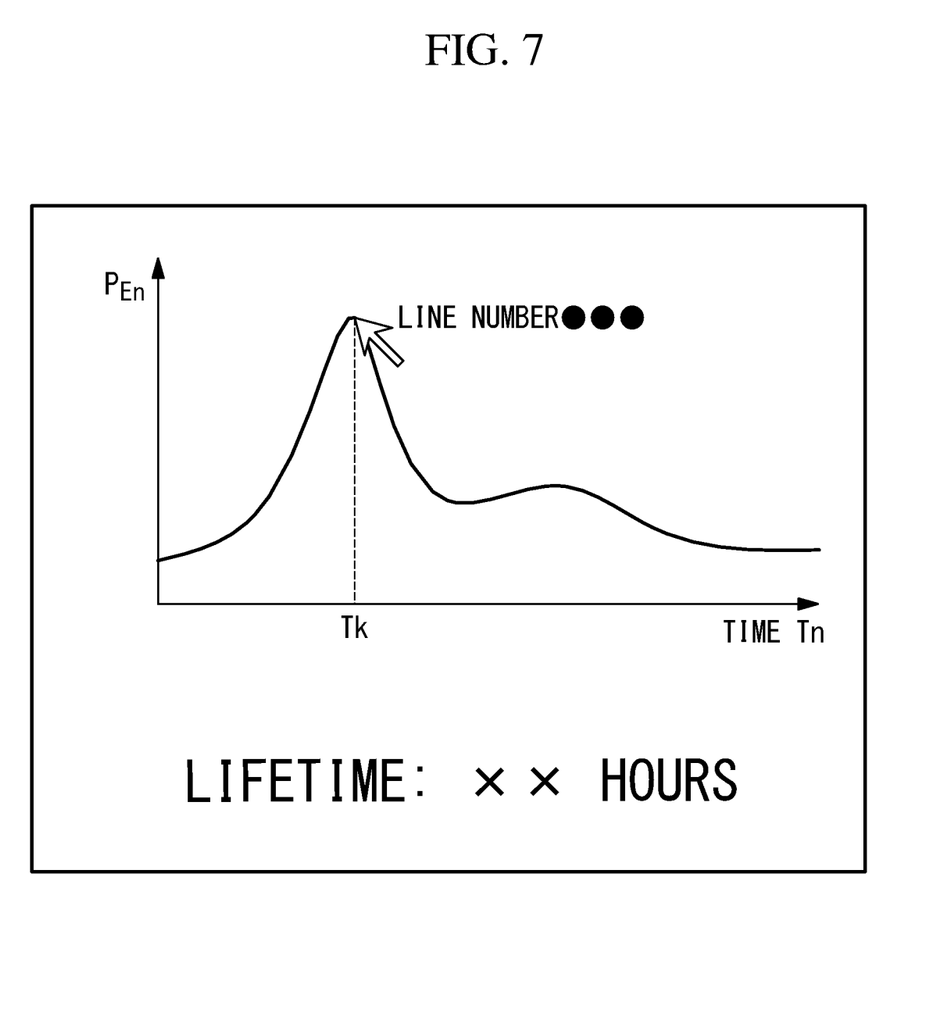
FIG. 7 is a diagram showing a modification of the display displayed on the monitor of the lifetime estimation device in FIG. 1.

Note that, in this embodiment, the time Tn at which the equivalent load $P_{En}$ becomes large can be confirmed because the time Tn and the equivalent load $P_{En}$ are associated with each other. In addition to this, the equivalent loads $P_{En}$ may be stored in association with the positions (line numbers) in the program, thereby allowing the user to specify a time Tk on the graph with the cursor and display the time Tk and/or the program position corresponding to the time Tk, as shown in FIG. 7. By doing so, the user can quickly recognize which command in the program should be corrected.

Figure 8:
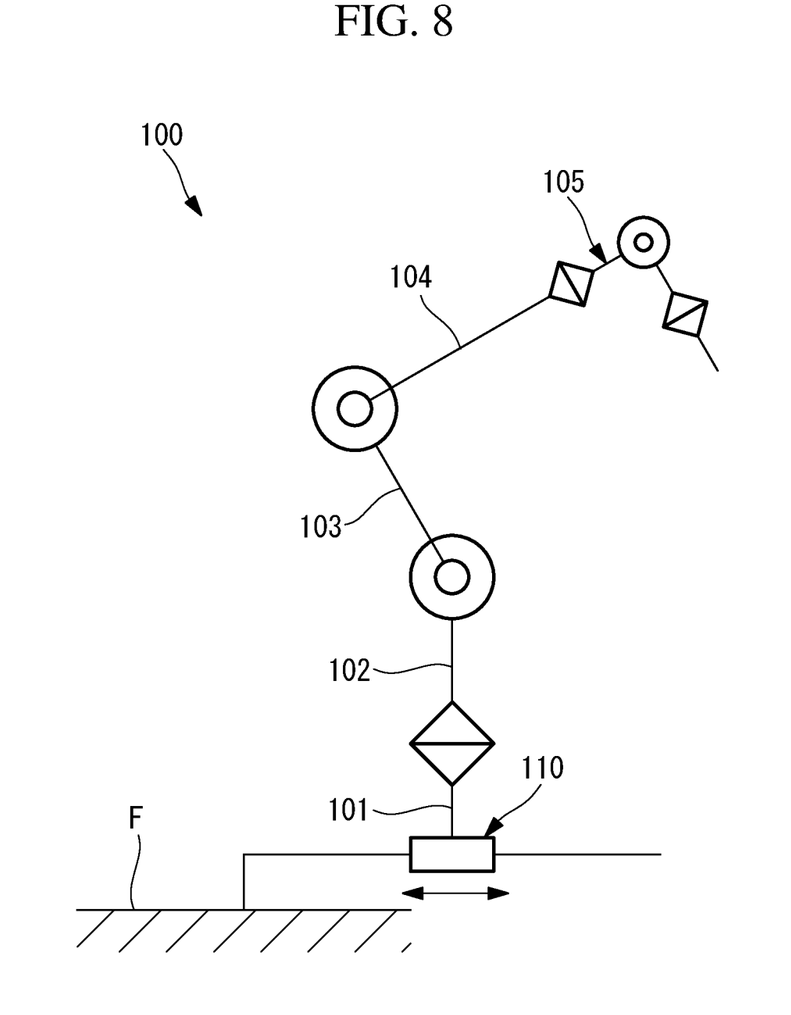
FIG. 8 is a schematic diagram showing another example of the robot in FIG. 1.

In addition, although this embodiment has been described by way of an example of the robot 100 having the linear-motion mechanism 110 between the first arm 103 and the second arm 104, instead of this, this embodiment may be applied to a robot 100 having the linear-motion mechanism 110 at an arbitrary position, including a position between the floor surface F and the base 101, as shown in FIG. 8.

In addition, the lifetimes of rotary shafts other than the shaft of the linear-motion mechanism 110 may be estimated by a conventional method, so that shafts having lifetimes E shorter than the predetermined threshold Th may be reported, in comparison with the lifetime E of the linear-motion mechanism 110.

Also, this embodiment has been described by way of an example of the linear-motion mechanism 110 including the guide rails 111 as the guide members. Instead of this, this embodiment may be applied to, for example, a linear-motion mechanism including, as the guide members 111, a ball spline or the like in which a sleeve (slider) is guided by means of rolling elements relative to a spline shaft. In this case, an expression appropriate for the linear-motion mechanism can be employed as the lifetime calculating expression (4).

In addition, although, in this embodiment, the calculated lifetime and the temporal change in the equivalent loads $P_{En}$ are displayed when the calculated lifetime E is shorter than the predetermined threshold Th, instead of this, the calculated lifetime and the temporal change in the equivalent loads $P_{En}$ may be displayed at all times. In addition, in the graph of a temporal change in the equivalent loads $P_{En}$, the time range in which the equivalent load $P_{En}$ exceeds the predetermined threshold Th may be explicitly displayed.

The invention claimed is:

1. A lifetime estimation device for a robot including a linear-motion mechanism including a guide member and at least one slider moving along the guide member, the lifetime estimation device comprising:
    a load calculation unit that calculates, at a predetermined time interval, a load acting on each slider on a basis of a program for operating the robot and geometric parameters of the robot and a load mounted on the robot;
    a travel-distance calculation unit that calculates a travel distance of the slider at the time interval;
    a lifetime calculation unit that calculates a lifetime of the linear-motion mechanism on a basis of loads calculated by the load calculation unit and the travel distance calculated by the travel-distance calculation unit; and
    a display unit that displays the calculated lifetime.

2. The lifetime estimation device for a robot according to claim 1, further comprising:
    a storage unit that stores the loads calculated by the load calculation unit such that the loads are associated with times in the program,
    wherein the display unit displays the loads stored in the storage unit.

3. The lifetime estimation device for a robot according to claim 2,
    wherein the display unit displays the loads in a time series manner.

4. The lifetime estimation device for a robot according to claim 2,
    wherein the display unit displays a time in the program at which the load exceeds a predetermined load threshold.

5. The lifetime estimation device for a robot according to claim 2,
    the display unit displays the loads if the lifetime calculated by the lifetime calculation unit is equal to or less than a predetermined lifetime threshold.

6. The lifetime estimation device for a robot according to claim 4,
    wherein the display unit displays the time if the lifetime calculated by the lifetime calculation unit is equal to or less than a predetermined lifetime threshold.

* * * * *